(No Model.) 3 Sheets—Sheet 1.
F. T. DONALDSON.
WAIST BELT.
No. 265,663. Patented Oct. 10, 1882.
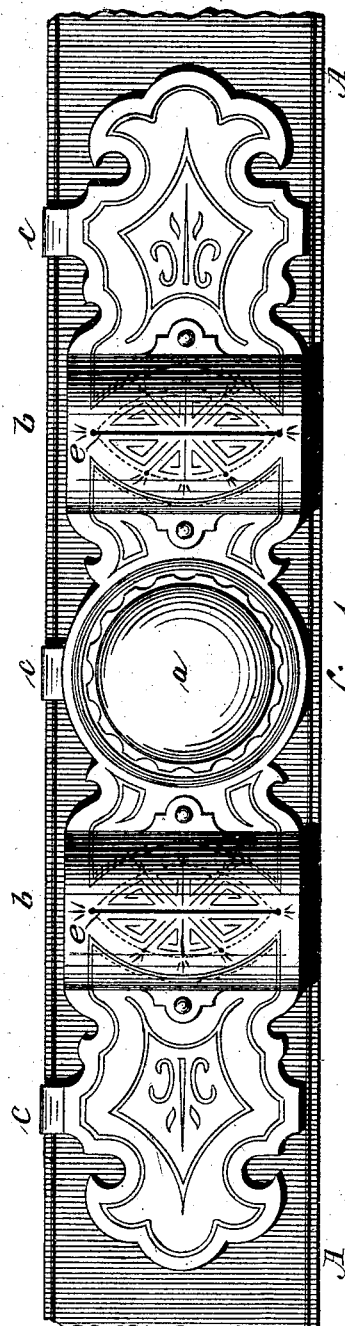
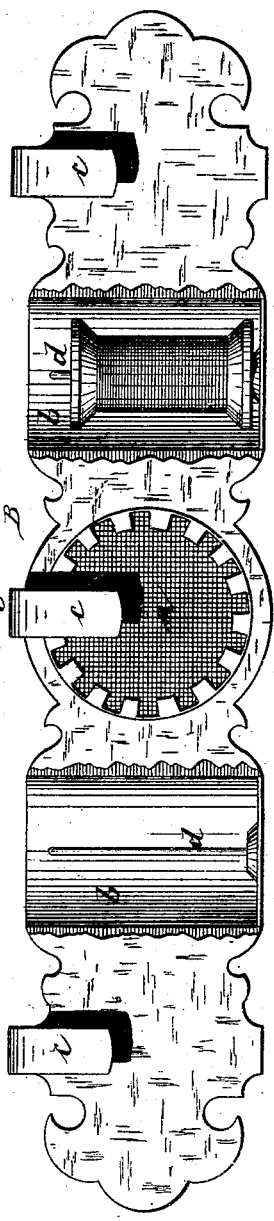
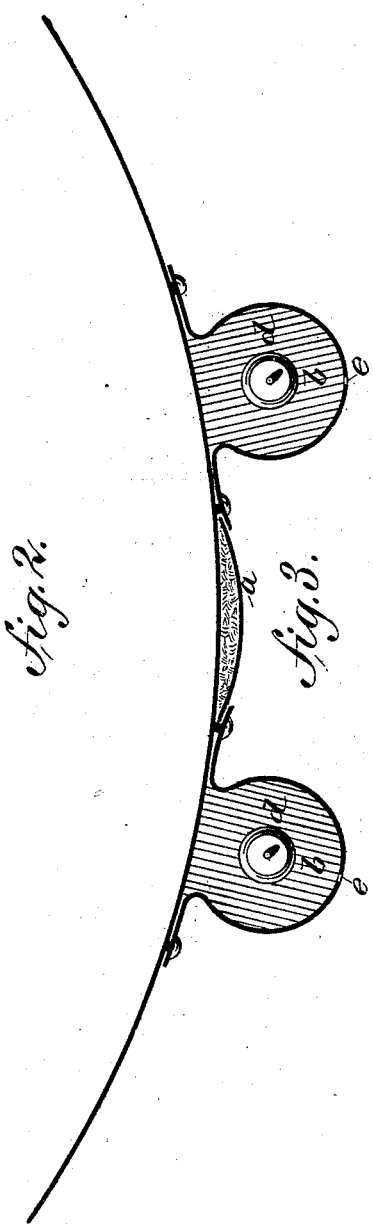
WITNESSES:
INVENTOR
Fanny T. Donaldson
BY
ATTORNEY (No Model.)  3 Sheets—Sheet 2.
F. T. DONALDSON.
WAIST BELT.
No. 265,663.  Patented Oct. 10, 1882.
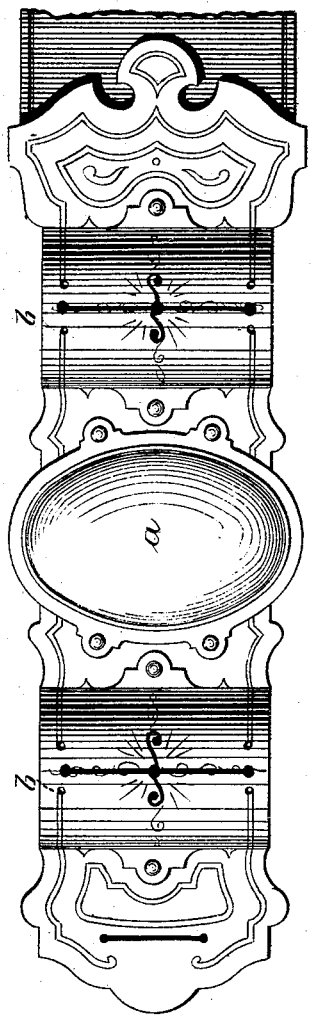
Fig. 4.
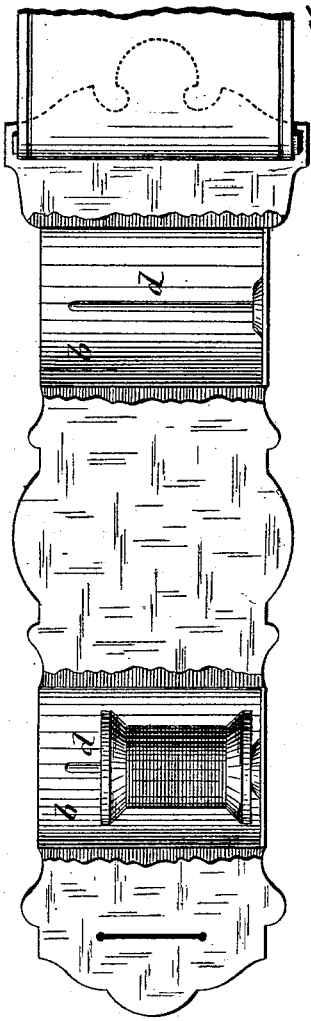
Fig. 5.
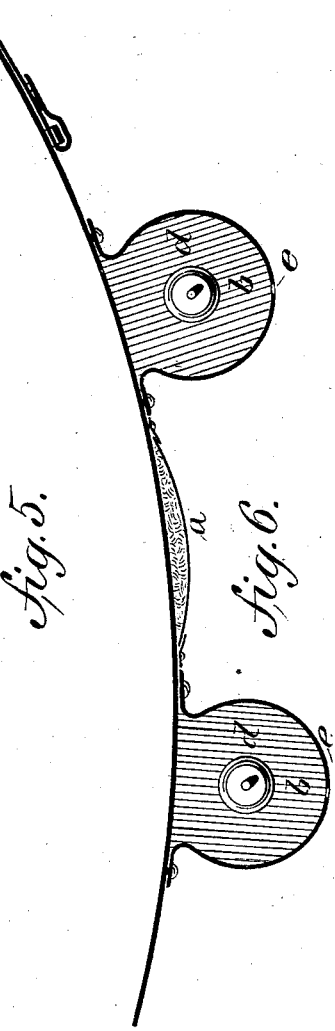
Fig. 6.
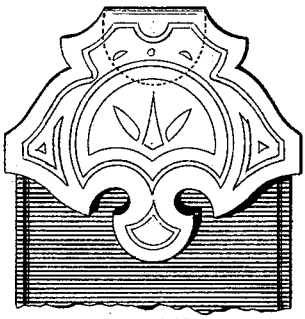
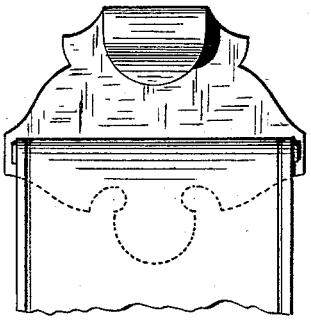
WITNESSES:
Geo. H. Rosenbaum
Sidney Mann
INVENTOR
Fanny T. Donaldson
BY Paul Goepel
ATTORNEY (No Model.) 3 Sheets—Sheet 3.
F. T. DONALDSON.
WAIST BELT.
No. 265,663. Patented Oct. 10, 1882.
Fig. 7.
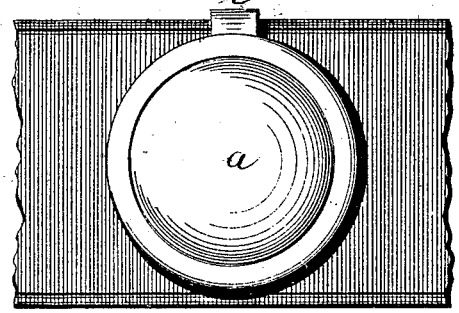
Fig. 9.    Fig. 8.    Fig. 10.
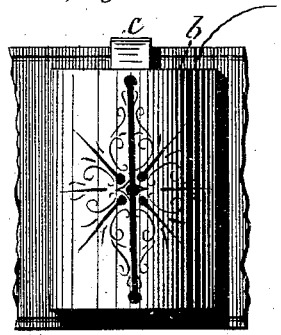    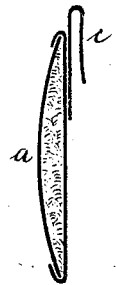    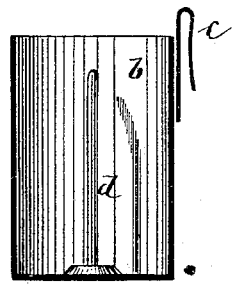
Fig. 11.
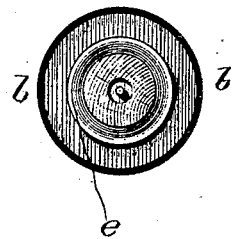
WITNESSES:              INVENTOR
                                               Fanny T. Donaldson
                                               BY Paul Goepel.
                                                     ATTORNEY

UNITED STATES PATENT OFFICE.

FANNY T. DONALDSON, OF CRANFORD, NEW JERSEY.

WAIST-BELT.

SPECIFICATION forming part of Letters Patent No. 265,663, dated October 10, 1882.

Application filed June 10, 1882. (No model.)

*To all whom it may concern:*

Be it known that I, FANNY T. DONALDSON, of Cranford, in the county of Union and State of New Jersey, have invented certain new and useful Improvements in Ladies' Waist-Belts, of which the following is a specification.

The object of this invention is to furnish, in connection with waist-belts, one or more spool receptacles or boxes and a pincushion for the more convenient and handy carrying about of pins, needles, and spools while sewing.

The invention consists of the combination, with a waist-belt, of a pincushion and one or more spool receptacles or boxes, said receptacles being open at the top and closed at the bottom and provided with a fixed vertical center pin and a front slit for the thread.

In the accompanying drawings, Figure 1 represents a front view of a waist-belt arranged with a pincushion and spool-boxes according to my invention. Fig. 2 is an inside or rear view of the same, with the back of spool-boxes broken away to show interior; and Fig. 3 is a horizontal section through the center of the same. Figs. 4, 5, and 6 represent respectively a front view, a rear or inside view, and a horizontal section of a modified construction shown as arranged in connection with a buckle; and Figs. 7, 8, 9, 10, and 11 represent details of a detachable pincushion and detachable spool-boxes.

Similar letters of reference indicate like parts in all the figures.

Referring to the drawings, A represents a waist-belt, and B an attachment thereto, composed of a pincushion, $a$, and spool-boxes $b\ b$. The entire attachment B is suspended from the top of belt by the hooks $c$, or riveted or otherwise fastened thereto. The spool-boxes $b\ b$ are open at the top, and provided at the bottom and in the center of each box with a vertical pin, $d$, that receives the spool, as shown in Figs. 2 and 5. The pin $d$ serves to retain the spool in place, and facilitates the unwinding of the thread, which passes out at the central vertical slit, $e$, in front of the spool-box, as shown in Figs. 1, 4, 7, and 11.

The pincushion $a$ and spool-boxes $b\ b$ may be secured to the belt attachment or clasp in any suitable manner, either by lugs stamped out or by rivets, or otherwise, or they may be formed out of the metal of the belt attachment itself.

If desired, the pincushion and spool-boxes may be made finished separately and attached to waist-belts by hooks or in any other manner, as shown in Figs. 7 to 11.

Having thus described my invention, I claim as new and desire to secure by Letters Patent—

1. The combination, with a waist-belt, of a detachable or fixed pincushion and one or more spool-receptacles connected thereto, substantially as set forth.

2. The combination, with a waist-belt, of one or more spool receptacles or boxes connected thereto, substantially as set forth.

In testimony that I claim the foregoing as my invention I have signed my name in presence of two subscribing witnesses.

FANNY T. DONALDSON.

Witnesses:
PAUL GOEPEL,
SIDNEY MANN.